United States Patent [19]

Wu et al.

[11] Patent Number: 4,525,578
[45] Date of Patent: Jun. 25, 1985

[54] PROCESS FOR THE PREPARATION OF POLYESTERAMIDE FROM CYCLIC LACTONE

[75] Inventors: Mu-Yen M. Wu; Lawrence E. Ball, both of Cuyahoga Falls, Ohio

[73] Assignee: The Standard Oil Company, Cleveland, Ohio

[21] Appl. No.: 533,616

[22] Filed: Sep. 19, 1983

Related U.S. Application Data

[63] Continuation of Ser. No. 336,543, Jan. 4, 1982, abandoned.

[51] Int. Cl.³ ............................................. C08G 69/44
[52] U.S. Cl. ................................ 528/354; 528/310; 528/327; 528/332; 528/359
[58] Field of Search ............... 528/354, 359, 310, 327, 528/332

[56] References Cited

U.S. PATENT DOCUMENTS

| | | | |
|---|---|---|---|
| 3,477,997 | 11/1969 | Gumboldt et al. | 528/354 |
| 3,499,879 | 3/1970 | Kobayashi et al. | 526/91 |
| 3,527,841 | 9/1970 | Wicker et al. | 528/354 |
| 3,554,983 | 1/1971 | Goodman et al. | 528/339 |
| 3,592,873 | 7/1971 | Ishida et al. | 528/354 |
| 3,629,203 | 12/1971 | Volker et al. | 528/310 |
| 4,283,524 | 8/1981 | Greene | 528/363 |

FOREIGN PATENT DOCUMENTS

| | | |
|---|---|---|
| 43-5908 | 3/1968 | Japan . |
| 1099184 | 1/1968 | United Kingdom . |
| 1158350 | 7/1969 | United Kingdom . |

*Primary Examiner*—Harold D. Anderson
*Attorney, Agent, or Firm*—David P. Yusko; John E. Miller, Jr.

[57] ABSTRACT

Polyesteramides can be prepared by copolymerizing a cyclic lactone with at least one of an ammonium salt of an alpha, beta unsaturated monocarboxylic acid, an alpha, beta unsaturated nitrile and water and beta-aminopropionic acids and their alkyl derivatives. Polymers with especially good physical properties were prepared by polymerizing caprolactone with one or more ammonium methacrylate, ammonium acrylate, acrylonitrile and beta-alanine. These polymers are useful as molding plastics.

13 Claims, No Drawings

PROCESS FOR THE PREPARATION OF POLYESTERAMIDE FROM CYCLIC LACTONE

This is a continuation of application Ser. No. 336,543 filed Jan. 4, 1982, now abandoned.

BACKGROUND OF THE INVENTION

This invention relates to a new process for preparing polyesteramides. The process comprises reacting a cyclic lactone with selected polyamide precursors.

Polyesteramides are known in the prior art. For example, polyesteramides prepared from caprolactone, hexamethylene diamine and a mixture of isophthalic acid and terephthalic acid are disclosed in U.S. Pat. No. 3,554,983. These polyesteramides contain macro molecular chains consisting essentially of ester units, diamine units and dicarbonyl units.

It is an object of this invention to provide new polyesteramides and a process for making them. These polyesteramides are water insoluble and can be used as fibers, plastics, films and molding resins.

SUMMARY OF THE INVENTION

It has now been discovered that novel polyesteramides can be prepared by polymerizing a cyclic lactone containing at least three carbon atoms with at least one member selected from the group consisting of: (1) an ammonium salt of an alpha, beta unsaturated carboxylic acid; (2) an alpha, beta unsaturated nitrile and water; and (3) beta-aminopropionic acid and alkyl derivatives thereof. In particular, especially useful polyesteramides can be prepared by polymerizing caprolactone with at least one of ammonium acrylate, ammonium methacrylate, acrylonitrile, methacrylonitrile and beta-alanine.

DETAILED DESCRIPTION

The Polymer

The polyesteramides prepared by the process of this invention are characterized as containing macro molecular chains consisting essentially of ester units of the structure —O—$(CR_2)_n$—CO— and amide units of the structure —$CR_2$—$CR_2$—CO—NH—. Each R is independently a suitable substituent which, in the simplest embodiment of the invention, would all be hydrogen and n is 2 to 11.

While the invention is directed principally to polyesteramides, it also includes within its ambit polyesteramides the polymer chains of which are formed from the above units together with other units which may be introduced into the chain, for example by adding suitable copolymerizable monomers to the polymerization mixture.

The properties of the resultant polyesteramides will depend upon the type of ester unit and type of amide unit used and the ratio of the various units. Generally, these polyester amides are random water insoluble copolymers.

The Process

These polyesteramides can be formed in a number of ways but particularly by reacting the cyclic lactone with polyamide precursors selected from the group consisting of ammonium salts of alpha, beta unsaturated carboxylic acids, alpha, beta unsaturated nitriles and water, and beta-aminopropionic acids and alkyl derivatives thereof under conditions such that in the absence of the cyclic lactone the polyamide precursor would polymerize to a water insoluble polyamide. This polymerization can be conducted under a broad range of process conditions which are generally known in the prior art. In the preferred practice of the invention, monomers are maintained at a temperature above the melting points but below the decomposition temperature of the products. It is generally preferred to conduct the process at a temperature between 100° C. and 300° C., and conducting the process between 135° C. and 200° C. is most preferred.

The temperature and amount of time required for polymerization are interrelated. At low temperatures it will take longer for a polymer to form than at high temperatures. Although this polymerization can take place in an open container in contact with the atmosphere, it is preferred to carry out the polymerization in the absence of oxygen. This can be achieved by blanketing the reaction mixture with either an inert gas such as nitrogen or with gaseous ammonia.

This reaction can proceed at atmospheric, superatmospheric or subatmospheric pressure. Normally, sufficient pressure is required to maintain the volatile ingredients in the liquid state under the polymerization conditions and to control the concentration of gaseous ingredients. Thus, the polymerization normally takes place under superatmospheric pressure. After the polymerization has proceeded for a suitable time, the pressure can be lowered to pull off water and other volatiles.

Another important factor in the conduct of the polymerization is the extent to which the reactants are able to physically contact each other so that the desired reaction can occur. Various solvents and liquid dispersions are helpful in improving the contacting. The polymerization can proceed by any of the generally known methods of polymerization including bulk, slurry, suspension or solution polymerization by batch, continuous or intermittant addition of the monomers and the other components. The cyclic lactone reactant can be represented by the following formula:

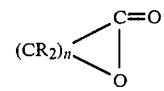

wherein n is 2 to 11 and R is preferably hydrogen or an alkyl radical. Examples of cyclic lactones which can be used in the inventive process include caprolactone, valerolactone and butyrolactone. The preparation of each of these lactones is well known in the art.

The amide portion of the polyesteramides is prepared from one of the following polyamide precursors: (1) ammonium salts or alpha, beta unsaturated carboxylic acids, (2) alpha, beta unsaturated nitriles, and (3) beta-aminopropionic acids and alkyl derivatives thereof. The preparation of a polyamide from ammonium salts of alpha, beta unsaturated carboxylic acids is shown in U.S. Pat. No. 4,283,524. Examples of ammonium salts of alpha, beta unsaturated carboxylic acids which are included within the scope of this invention are ammonium acrylate, ammonium methacrylate and ammonium crotonate.

The preparation of polyamides from alpha, beta unsaturated nitriles and water is shown in U.S. Pat. Nos. 3,629,203 and 3,499,879. Examples of alpha, beta unsaturated nitriles which are within the scope of this invention include acrylonitrile and methacrylonitrile.

The preparation of polyamides from beta-aminopropionic acid and alkyl derivatives thereof is shown in U.S. Pat. No. 2,691,643. Examples of these beta-aminopropionic acids include beta-alanine and alpha-beta-alanine.

The preparation of polyamides from the copolymerization of an ammonium salt of an alpha, beta unsaturated carboxylic acid and an alpha, beta unsaturated nitrile is shown in U.S. Ser. No. 175,180, which is herein incorporated. Examples of these monomers are shown above.

Concentration of the reactants may vary widely. However, the polyamide precursor/cyclic lactone molar ratio is larger than 1 and preferably is greater than 2:1.

On completion of the polymerization reaction, the polymeric product may be removed and purified in any suitable manner. Normally, no special procedure is required and the product obtained after cooling may be used as such. The product may be modified with additives such as heat and light stabilizers, mold lubricants, release agents, pigments, dyes and fillers (e.g. fibers, glass, asbestos, ground glass, graphite, carbon black, metals and metal oxides) and blended with other plastic materials, natural or synthetic.

SPECIFIC EMBODIMENTS

In order to provide a better understanding of the present invention, the following working examples are presented. The reactants were charged into a 25 ml glass ampoule, which was flushed with $N_2$ for 30 seconds, sealed with a flame and then put into a cage. The cage is heated in an air oven for the temperature and time required. The ampoule was taken from the oven, cooled to room temperature and put into dry ice/isopropanol bath. The ampoule was carefully opened with a hot glass rod. The crude polymer was dissolved in formic acid, followed by precipitation of the polymer into 20 times its volume of acetone. The resulting powdery polymer was dried in a vacuum oven at 60° C. for 16 hours. The polymer was then water extracted overnight and dried in a vacuum oven. The results are shown in Table I. The intrinsic viscosity was determined in a 90% formic acid solution at 25° C.

TABLE I

| Ex. | Monomers (Molar Ratio) | Product Composit. | Water Insolub. (%) | Intrin. Viscos. (dl/g) | Crystal. (%) |
|---|---|---|---|---|---|
| | | Temperature: 170° C. Time: 96 hours | | | |
| A | Caprolactone/ H₂O (1/3) | — | 0 | — | — |
| B | Acrylamide/ Caprolactone/ Water (3/1/3) | — | 0 | — | — |
| C | Acrylonitrile/ Water/ Caprolactone (1/1/3) | — | 0 | — | — |
| D | Acrylonitrile/ Water/ Caprolactone (1/1/1) | — | 0 | — | — |

TABLE I-continued

| Ex. | Monomers (Molar Ratio) | Product Composit. | Water Insolub. (%) | Intrin. Viscos. (dl/g) | Crystal. (%) |
|---|---|---|---|---|---|
| | | Temperature: 170° C. Time: 96 hours | | | |
| 1 | Ammonium Acrylate/ Caprolactone (2/1) | 32% Ester 68% Amide | 53 | 0.2 | 29.7 |
| 2 | Ammonium Acrylate/ Acrylonitrile Caprolcatone (53/27/20) | 14% Ester 86% Amide | 35 | 0.1 | 23.2 |
| 3 | Acrylonitrile/ Water/ Caprolactone (3/3/1) | 22% Ester 78% Amide | 38 | 0.3 | 28.4 |

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

I claim:

1. A process for preparing a solid moldable polyesteramide comprising polymerizing a cyclic lactone containing at least three carbon atoms with an ammonium salt of an alpha, beta-unsaturated monocarboxylic acid, wherein the molar ratio of the ammonium salt to the cyclic lactone is greater than 1.

2. The process of claim 1, wherein the cyclic lactone is caprolactone.

3. The process of claim 1, wherein the ammonium salt of an alpha, beta-unsaturated carboxylic acid is at least one of ammonium acrylate or ammonium methacrylate.

4. The process of claim 1, wherein the molar ratio of the ammonium salt to the cyclic lactone is greater than 2.

5. A process for preparing a polyesteramide comprising polymerizing a cyclic lactone containing at least three carbon atoms with an alpha, beta-unsaturated nitrile and water wherein the molar ratio of the nitrile to the cyclic lactone is greater than 1.

6. The process of claim 5, wherein the cyclic lactone is caprolactone.

7. The process of claim 5, wherein the alpha, beta-unsaturated nitrile is acrylonitrile or methacrylonitrile.

8. The process of claim 5, wherein the molar ratio of the nitrile to the cyclic lactone is greater than 2.

9. A process for preparing a solid moldable polyesteramide comprising polymerizing a cyclic lactone with an ammonium salt of an alpha, beta-unsaturated monocarboxylic acid and alpha, beta-unsaturated nitrile, wherein the molar ratio of the ammonium salt and the nitrile to the cyclic lactone is greater than 1.

10. The process of claim 9, wherein the cyclic lactone is caprolactone.

11. The process of claim 9, wherein the ammonium salt of an alpha, beta-unsaturated carboxylic acid is at least one of ammonium acrylate or ammonium methacrylate.

12. The process of claim 9, wherein the alpha, beta-unsaturated nitrile is at least one of acrylonitrile or methacrylonitrile.

13. The process of claim 9, wherein the molar ratio of the ammonium salt of an alpha, beta-unsaturated nitrile to the cyclic lactone is greater than 2.

* * * * *